United States Patent
Blaber et al.

(10) Patent No.: US 11,646,058 B1
(45) Date of Patent: May 9, 2023

(54) HEAT-ASSISTED MAGNETIC RECORDING HEAD WITH A HEAT SINK AND A DIFFUSION BARRIER

(71) Applicant: Seagate Technology LLC, Fremont, CA (US)

(72) Inventors: Martin Giles Blaber, Minneapolis, MN (US); Michael Allen Siegler, Eden Prairie, MN (US); James G Wessel, Savage, MN (US); YuHang Cheng, Edina, MN (US); Scott M Franzen, Lakeville, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/657,167

(22) Filed: Mar. 30, 2022

(51) Int. Cl.
*G11B 13/08* (2006.01)
*G11B 5/31* (2006.01)
*G11B 5/00* (2006.01)

(52) U.S. Cl.
CPC ............ *G11B 13/08* (2013.01); *G11B 5/3106* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,130,599 B2 | 3/2012 | Komura et al. | |
| 8,169,731 B2 | 5/2012 | Mizuno et al. | |
| 8,208,349 B2 | 6/2012 | Tanaka et al. | |
| 8,243,559 B2 | 8/2012 | Komura et al. | |
| 8,325,567 B2 | 12/2012 | Miyauchi et al. | |
| 8,437,230 B2 | 5/2013 | Aoki et al. | |
| 8,934,198 B2 | 1/2015 | Zou et al. | |
| 9,153,267 B1 | 10/2015 | Komura et al. | |
| 9,251,837 B2 | 2/2016 | Zhu et al. | |
| 9,449,625 B1* | 9/2016 | Vossough | G11B 5/314 |
| 9,620,151 B1 | 4/2017 | Shimazawa et al. | |
| 9,626,991 B2 | 4/2017 | Chen et al. | |
| 9,728,209 B2 | 8/2017 | Chen et al. | |
| 9,799,352 B1 | 10/2017 | Chen et al. | |
| 10,043,542 B2 | 8/2018 | Shimazawa et al. | |
| 10,061,088 B1* | 8/2018 | Peng | G02B 6/3532 |
| 10,062,401 B1 | 8/2018 | Zhao et al. | |
| 10,229,704 B2 | 3/2019 | Blaber et al. | |
| 10,311,906 B2 | 6/2019 | Blaber et al. | |
| 10,388,307 B1* | 8/2019 | Bance | G11B 5/6088 |
| 10,490,214 B1 | 11/2019 | Chen et al. | |
| 10,490,221 B1 | 11/2019 | Chen et al. | |

(Continued)

FOREIGN PATENT DOCUMENTS

WO 2016191707 A1 12/2016

*Primary Examiner* — Peter Vincent Agustin (57) ABSTRACT

A heat-assisted magnetic recording head includes a near-field transducer, a heat sink, a diffuser, and a diffusion barrier. The near-field transducer is configured to produce a hot spot on a proximate magnetic disk. The heat sink is configured to draw heat away from the near-field transducer. The heat sink is disposed in a down-track direction relative to and coupled to the near-field transducer. The diffuser is configured to draw heat away from the heat sink. The diffuser is disposed in a down-track direction relative to the heat sink. The diffusion barrier includes a metal. The diffusion barrier is disposed between and coupled to the heat sink and the diffuser.

20 Claims, 5 Drawing Sheets

(56) References Cited

U.S. PATENT DOCUMENTS

| | | | |
|---|---|---|---|
| 10,580,440 B2 | 3/2020 | Sahoo et al. | |
| 10,586,560 B1 | 3/2020 | Wang et al. | |
| 10,636,440 B2 | 4/2020 | Cheng et al. | |
| 10,699,732 B2 | 6/2020 | Cheng et al. | |
| 10,872,628 B1* | 12/2020 | Shimazawa | G11B 7/1387 |
| 10,916,262 B1 | 2/2021 | Janjua et al. | |
| 11,049,516 B1 | 6/2021 | Ikegawa et al. | |
| 2012/0045662 A1* | 2/2012 | Zou | G11B 5/3133 |
| | | | 428/810 |
| 2014/0268418 A1* | 9/2014 | McKinlay | G11B 5/112 |
| | | | 29/603.07 |
| 2016/0351211 A1* | 12/2016 | Blaber | G11B 5/6082 |
| 2019/0206433 A1* | 7/2019 | Staffaroni | G11B 5/314 |
| 2021/0027808 A1 | 1/2021 | Matsumoto et al. | |
| 2021/0027809 A1 | 1/2021 | Habibi et al. | |

* cited by examiner

HEAT-ASSISTED MAGNETIC RECORDING HEAD WITH A HEAT SINK AND A DIFFUSION BARRIER

TECHNICAL FIELD

The disclosure relates to a near-field transducer for a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. The process of generating and condensing localized surface plasmons (LSPs) on the NFT to produce the hot spot generates enormous amounts of heat which may degrade and/or deform various components of the NFT, thus potentially reducing the performance and/or life expectancy of the HAMR head and the HDD.

SUMMARY

The present disclosure describes a heat-assisted magnetic recording (HAMR) head having a heat sink that is disposed between a near-field transducer (NFT) and a diffuser. The heat sink functions to draw heat away from the NFT. The diffuser functions to draw heat away from the heat sink and dissipate the heat toward other regions of an associated structure (e.g., a heat sink of an associated slider). A diffusion barrier is disposed between and coupled to the heat sink and the diffuser. In some examples, the diffusion barrier resists diffusion of metal away from the heat sink and/or diffuser under thermal stress, such as thermal stress introduced during operation of the HAMR head. By resisting diffusion of metal away from the heat sink and/or diffuser, the diffusion barrier may reduce the formation of defects such as voids and may extend the operation lifetime of the HAMR head.

In one example, a HAMR head includes an NFT configured to produce a hot spot on a proximate magnetic disk; a heat sink configured to draw heat away from the NFT, wherein the heat sink is disposed in a down-track direction relative to and coupled to the NFT; a diffuser configured to draw heat away from the heat sink, wherein the diffuser is disposed in a down-track direction relative to the heat sink; and a diffusion barrier including a metal and disposed between and coupled to the heat sink and the diffuser.

These and other features and aspects of various examples may be understood in view of the following detailed discussion and accompanying drawings.

DETAILED DESCRIPTION

Figure 1:
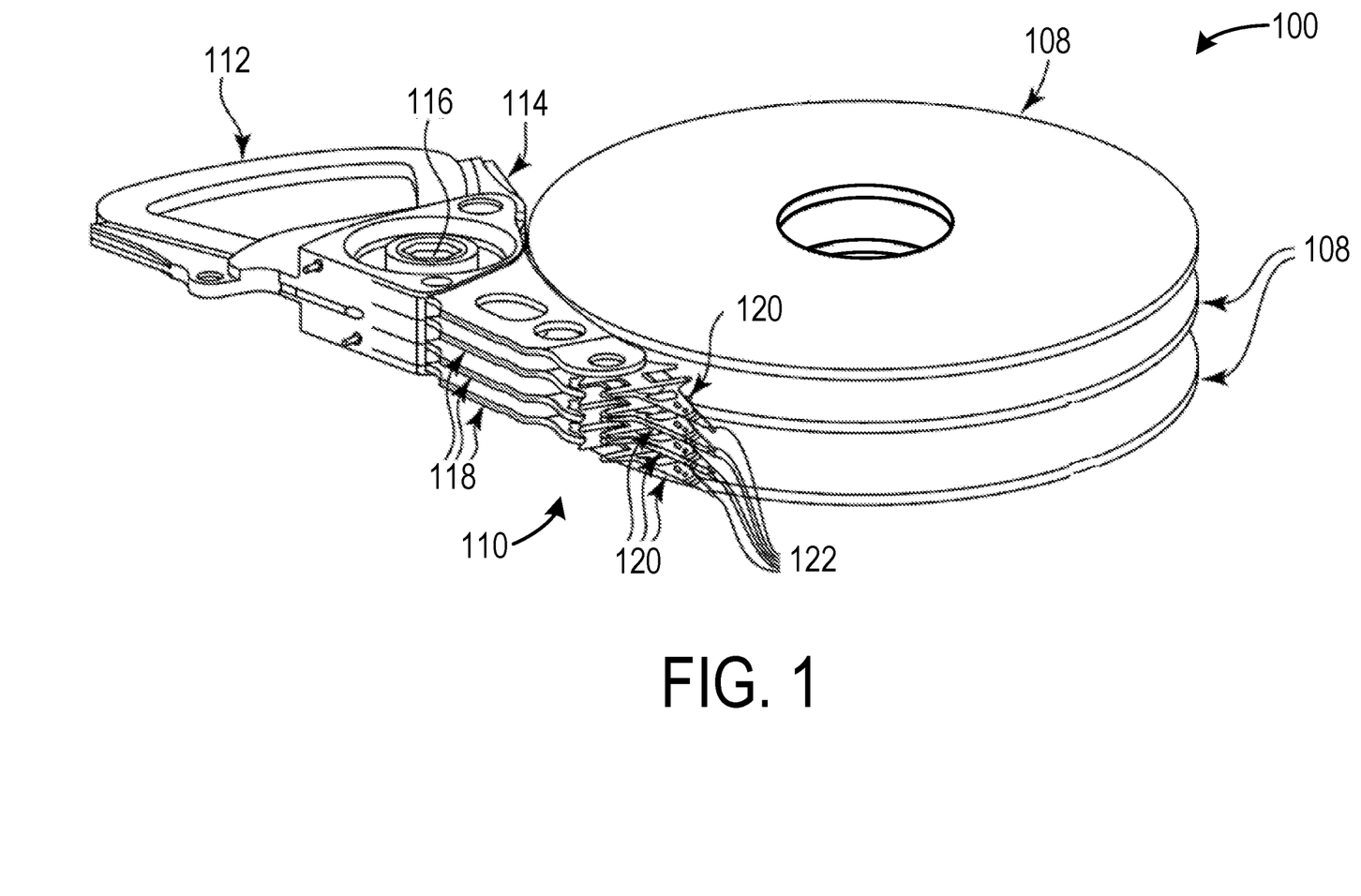
FIG. 1 is a perspective view of an example hard disk drive, in accordance with aspects of this disclosure.

FIG. 1 is a perspective view of an example heat assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
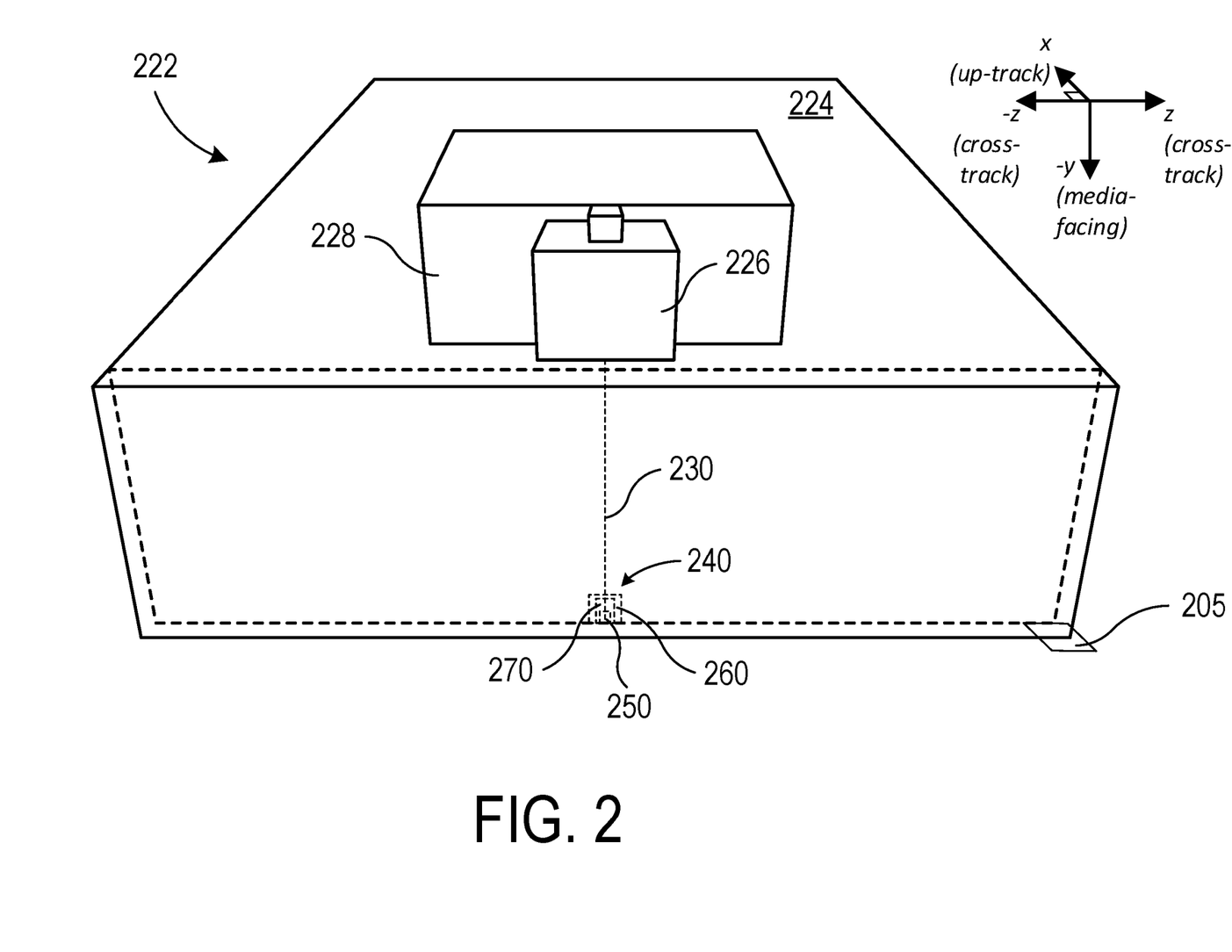
FIG. 2 is a perspective view of an example slider, in accordance with aspects of this disclosure.

FIG. 2 is a perspective view of an example slider 222, in accordance with aspects of this disclosure. Slider 222 is an example of slider 122 of FIG. 1. In the example of FIG. 2, slider 222 includes a slider body 224, a laser 226, a submount 228, and a HAMR head 240.

HAMR head 240 is configured to read data from and write data to a surface of a magnetic disk. HAMR head 240 includes a waveguide 230, a near-field transducer (NFT) 250, a writer 260, and a reader 270. In the example of FIG. 2, some features or parts of features of NFT 250, writer 260, and reader 270 are presented on a media-facing surface 205 that is positioned over a surface of a magnetic disk during some operations of the HDD (e.g., write operations, read operations). In some examples, media-facing surface 205 is an air-bearing surface (ABS) that is configured to maintain magnetic recording head 240 at a target spacing (e.g., a head-media spacing) from a surface of the magnetic disk during some operations of HDD 100. During such operations, media-facing surface 205 faces and is held proximate to the moving surface of the magnetic disk by a cushion of gas, known as an active air bearing (AAB), that is produced from a dynamic flow of gas across a pattern of recessed sub-surfaces bound within the volume of slider body 224 by media-facing surface 205.

In some examples, laser 226 emits photons with a wavelength in the near infrared range (e.g., approximately 830 nm) or visible range. Examples of laser 226 include an optically pumped semiconductor laser, a quantum well laser, an integrated laser, or other suitable laser. Laser 226 of this example may be configured as an edge emitting laser (EEL), vertical cavity surface emitting laser (VCSEL), or other type of laser. Other example HAMR heads may include other types of light sources such as light emitting diodes (LEDs) and surface emitting diodes.

In one example, laser 226 is coupled to slider body 224 via submount 228. In the example of FIG. 2, laser 226 and submount 228 are located on a face of slider body 224 which is opposite to media-facing surface 205. In some examples, laser 226 may be directly mounted to the slider body 224. In some examples, laser 226 may be integrated into slider body 224 (e.g., through a transfer-printing process during fabrication of slider 222). Submount 228 may be configured to redirect photons output from laser 226 so that the photons are directed into waveguide 230 in the negative y-direction of FIG. 2 (e.g., toward NFT 250). The path between laser 226 and waveguide 230 may include one or more optical couplers, mode converters, and/or mode couplers. Waveguide 230 is formed integrally within slider body 224 and is configured to deliver photons from laser 226 to NFT 250. While FIG. 2 illustrates laser 226 coupled to slider body 224 via submount 228, in some examples, laser 226 may be directly mounted to slider body 224.

NFT 250 is configured to create a small hot spot on a magnetic disk. For example, NFT may generate and support a distribution of localized surface plasmons (LSPs) upon receiving incident photons from laser 226 by way of waveguide 230 and may condense the LSP distribution on an area or feature of NFT 250. NFT 250 amplifies a near-field of the condensed LSP distribution and focuses the near-field toward a surface of a magnetic disk (e.g., a magnetic disk 108 of FIG. 1) to produce a hot spot. Writer 260 is configured to generate a magnetic field from an electrical current and direct the magnetic field at the hot spot on the magnetic disk. The near-field energy heats and lowers the coercivity of the magnetic grains in the hot spot, thereby enabling these magnetic grains to be oriented by the magnetic field generated by writer 260. Turning off laser 226 or moving NFT 250 toward a different location of the magnetic disk (or moving the magnetic disk such that NFT 250 faces a different location of the magnetic disk) removes the focused near-field energy from the hot spot. Removing the near-field energy allows the magnetic grains contained in the spot to cool. The cooling locks in the grain orientation induced by the magnetic field generated by writer 260, thus preserving the bits of written data.

Figure 3A:
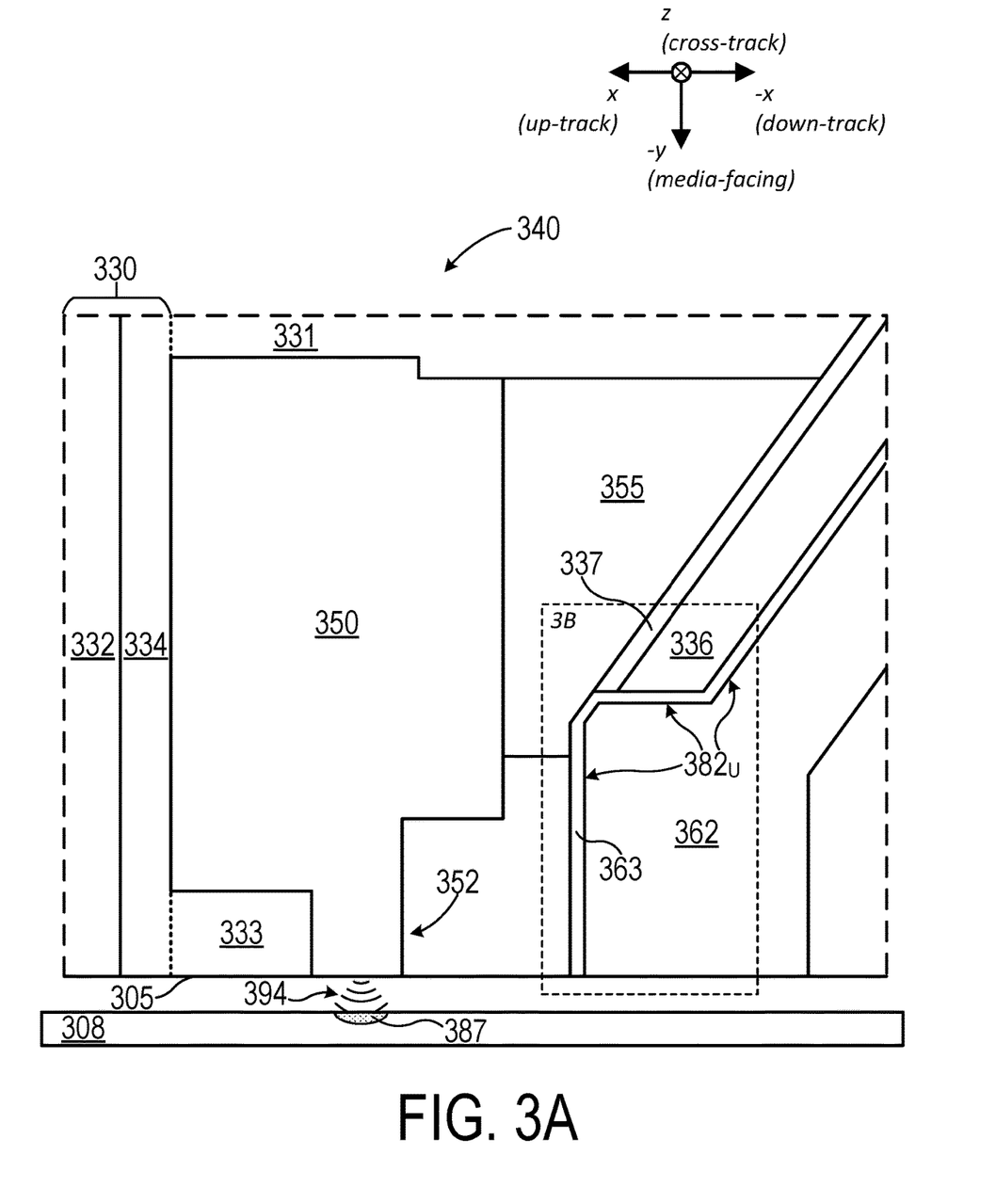
FIG. 3A is a cross-sectional view of an example HAMR head, in accordance with aspects of this disclosure.

FIG. 3A is a cross-sectional view of an example HAMR head, in accordance with aspects of this disclosure. HAMR head 340 includes a waveguide 330, an NFT 350, a write pole 362, a heat sink 355, a diffuser 336, and a diffusion barrier 337. HAMR head 340 of the example of FIG. 3A includes a write pole diffusion barrier 363.

Waveguide 330 directs photons from a light source (e.g., laser 226 of FIG. 2) toward NFT 350. In some examples, waveguide 330 includes multiple optical layers. Waveguide 330, for example, may include a waveguide core 332 and a core-to-NFT spacing (CNS) layer 334. CNS layer 334 may be part of a cladding structure that also includes a rear cladding layer 331 and/or a front cladding layer 333. In some examples, waveguide core 332 includes a dielectric material (e.g., niobium oxide, tantalum oxide) and CNS layer 334 includes another, different dielectric material (e.g., aluminum oxide, silicon dioxide). In one example, the refractive index of waveguide core 332 is different than the refractive index of CNS layer 334.

NFT 350 is disposed in a down-track direction relative to waveguide 330 and is coupled to waveguide 330. NFT 350 includes a plasmonic metal. As used herein, a plasmonic metal is a metal that possesses properties (e.g., electrical properties, optical properties) that promote resonance coupling between photons incident upon the plasmonic metal and free electrons of the plasmonic metal. Examples of plasmonic metals include gold, silver, ruthenium, copper, aluminum, and rhodium, among others. NFT 350 may include an alloy that includes a plasmonic metal. In some examples, NFT 350 includes a plasmonic metal and a noble metal (e.g., palladium, osmium, iridium, or platinum).

NFT 350 may include a peg 352 that is configured to amplify and emit near-field 394 to produce a hot spot 387 on magnetic disk 308. Peg 352 is disposed proximal to a media-facing surface 305 of HAMR head 340. In some instances, one or more portions of peg 352 are exposed on media-facing surface 305.

Write pole 362 is disposed in a down-track direction relative to waveguide 330 and NFT 350. Write pole 362 is configured to generate a magnetic field in response to a current passed through a writer coil of HAMR head 340. Near-field 394 and a magnetic field from write pole 362 are directed to be partially coincident on hot spot 387 on magnetic disk 308 such that the temperature increase resulting from near-field 394 reduces the magnetic coercivity of the grains within hot spot 387 and enables the magnetic field from write pole 362 to orient the magnetic moments of the grains more easily, thus producing more stable bits of written data upon cooling.

Heat sink 355 is disposed in a down-track direction relative to NFT 350 and is coupled to NFT 350. Heat sink 355 is configured to draw heat away from NFT 350. In some examples, drawing heat away from regions of NFT 350 that are prone to thermal degradation may reduce defect formation in NFT 350 and/or extend the operating lifetime of HAMR head 340.

Heat sink 355 may include one or more thermally conductive metals, thermally robust metals, and/or noble metals. Examples of thermally conductive metals include a metal having a thermal conductivity of at least 100 W/mK or, in some examples, at least 300 W/mK, such as gold or copper. Examples of thermally robust metals include metal having a high melting temperature, such as a melting temperature of at least 1500° C. In some examples, a thermally robust metal has a melting temperature of at least 1800° C. In some examples, a thermally robust metal has a melting temperature of at least 2200° C. Examples of thermally robust metals include rhodium, tungsten, tantalum, iridium, platinum, ruthenium, or iron. In some examples, heat sink 355 includes a noble metal that is also a thermally robust metal (e.g., platinum group metals including platinum, iridium, rhodium, ruthenium, osmium, or palladium).

A thermally conductive metal, a thermally robust metal, and/or a noble metal may be a primary metal of heat sink 355. As used herein, a "primary metal" of a feature is a metal that constitutes a higher atomic percentage of the feature than any other metal that is also present in the feature. In some examples, a primary metal of a feature constitutes a majority of the feature. For example, a primary metal of heat sink 355 may constitute greater than 50 atomic percent of heat sink 355.

Diffuser 336 is disposed in a down-track direction relative to heat sink 355. Diffuser 336 is configured to draw heat away from heat sink 355 and dissipate the heat toward other areas of the associated slider (e.g., toward other heat sinks of slider 222 of FIG. 2). Diffuser 336 includes one or more metals. In some examples, diffuser 336 includes a thermally conductive metal, a thermally robust metal, and/or a noble metal. In some examples, diffuser 336 includes a noble metal that is also a thermally robust metal. A thermally conductive, a thermally robust metal, and/or a noble metal may be a primary metal of diffuser 336.

Write pole diffusion barrier 363 is disposed along an up-track surface 382U of write pole 362. Write pole diffusion barrier 363 includes a segment disposed between and coupled to heat sink 355 and write pole 362. Write pole diffusion barrier 363 includes a segment disposed between and coupled to diffusion barrier 337 and write pole 362. Write pole diffusion barrier 363 includes a segment disposed between and coupled to diffuser 336 and write pole 362. Write pole diffusion barrier 363 is configured to resist diffusion of metal from features of HAMR head 340 (e.g., NFT 350, heat sink 355) to write pole 362. Write pole diffusion barrier 363 may include a plasmonic metal and/or a noble metal.

In accordance with aspects of this disclosure, HAMR head 340 includes a diffusion barrier 337 configured to resist diffusion of a metal from heat sink 355. Diffusion barrier 337 is disposed between and coupled to heat sink 355 and diffuser 336. Including diffusion barrier 337 between heat sink 355 and diffuser 336 may, in some examples, mitigate diffusion of a metal of heat sink 355 and/or diffuser 336 away from the respective feature (e.g., diffusion of gold). Reducing diffusion of a metal away from heat sink 355 and/or diffuser 336 may reduce the formation of defects such as voids, which may preserve the integrity and function of heat sink 355 and/or diffuser 336. Preserving heat sink 355 and/or diffuser 336 may extend the operating lifetime of HAMR head 340.

Diffusion barrier 337 may include a thermally robust metal, a thermally conductive metal, and/or a noble metal. A thermally robust metal of diffusion barrier 337 may have a melting temperature of at least 1500° C., and, in some examples, a melting temperature of at least 1800° C. or at least 2200° C. Examples of thermally robust metals that may be included in diffusion barrier 337 are iridium, rhodium, ruthenium, osmium, rhenium, tungsten, molybdenum, niobium, tantalum, platinum, palladium, chromium, vanadium, titanium, zirconium, or hafnium. A thermally conductive metal of diffusion barrier 337 may have a thermal conductivity of at least 50 W/mK (e.g., rhodium, tungsten, molybdenum, niobium, tantalum, or chromium). Utilizing a thermally robust metal in diffusion barrier 337 may reduce oxidation and/or formation of defects (e.g., voiding, interface delamination) under thermal exposure. Utilizing a thermally conductive metal in diffusion barrier 337 may promote heat dissipation from heat sink 355 to diffuser 336, potentially reducing defect formation in heat sink 355 and extending the operating lifetime of HAMR head 340. Utilizing a noble metal (e.g., a platinum group metal) in diffusion barrier 337 may reduce oxidation and related defects (e.g., interfacial defects) at elevated temperatures and may, in some examples, reduce diffusion of metals into diffuser 336 (e.g., from heat sink 355).

In some examples, diffusion barrier 337 includes a thermally robust, noble, platinum group metal having a melting temperature of at least 1800° C. and a thermal conductivity of at least 80 W/mK (e.g., iridium, rhodium, ruthenium, osmium). In one example, diffusion barrier 337 includes a thermally robust, noble, platinum group metal having a melting temperature of at least 1800° C. and the thermal conductivity of at least 140 W/mK (e.g., iridium, rhodium). In one example, diffusion barrier 337 includes a thermally robust, noble, platinum group metal having a melting temperature of at least 2200° C. and a thermal conductivity of at least 110 W/mK (e.g., iridium, ruthenium). In one example, diffusion barrier 337 includes a thermally robust, noble, platinum group metal having a melting temperature of at least 2200° C. and a thermal conductivity of at least 140 W/mK (e.g., iridium).

A thermally robust metal, a thermally conductive metal, and/or a noble metal may be a primary metal of diffusion barrier 337. A primary metal of diffusion barrier 337 may be different than a primary metal of heat sink 355. A primary metal of diffusion barrier 337 may be different than a primary metal that constitutes a majority of diffuser 336. In some examples, a primary metal of diffusion barrier 337 constitutes at least 50 atomic percent of diffusion barrier 337. In some examples, a primary metal of diffusion barrier 337 constitutes at least 90 atomic percent of diffusion barrier 337. In some examples, a primary metal of diffusion barrier 337 constitutes at least 95 atomic percent of diffusion barrier 337. In some examples, a primary metal of diffusion barrier 337 constitutes at least 99 atomic percent of diffusion barrier 337.

Figure 3B:
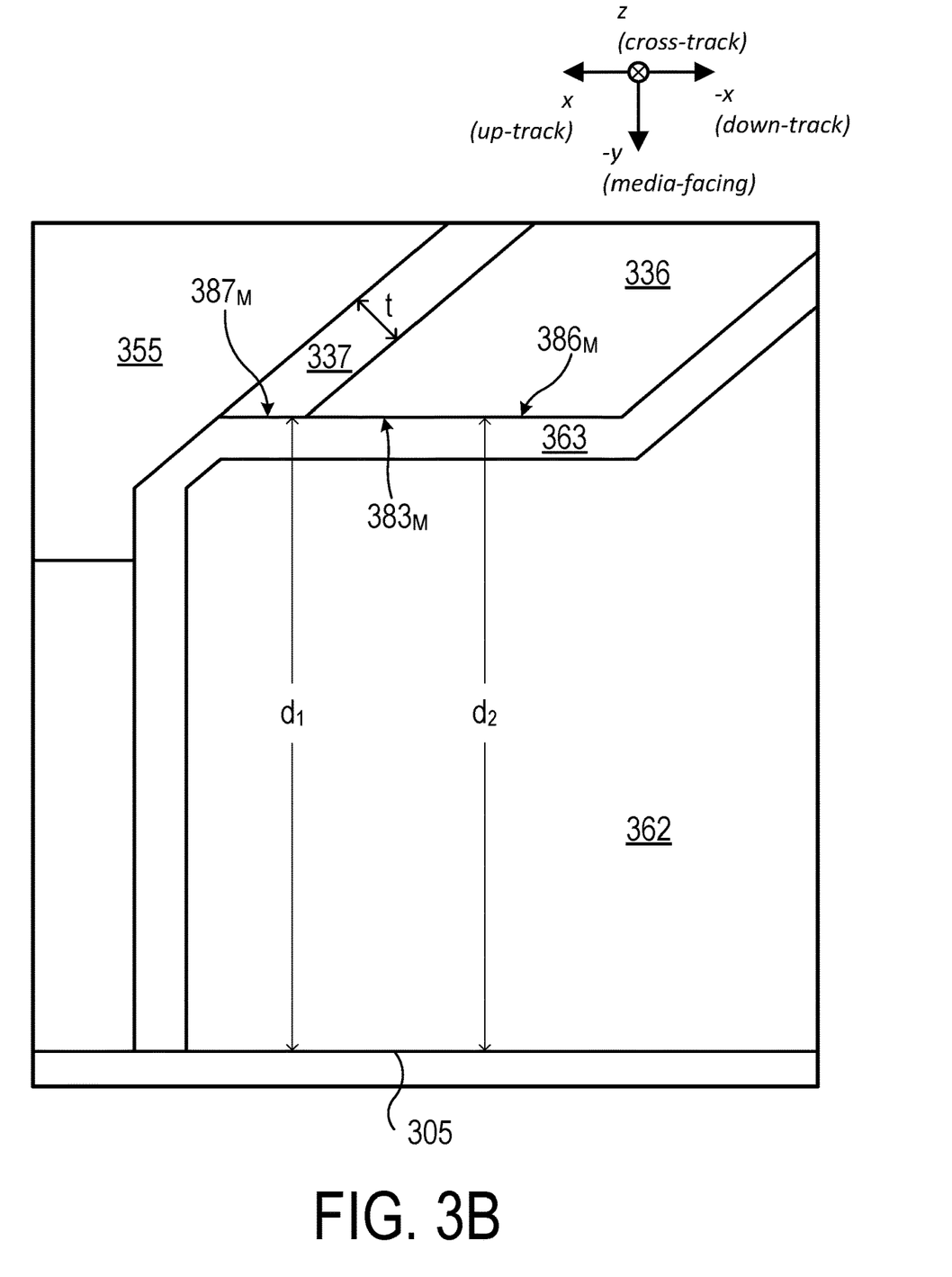
FIG. 3B is a cross-sectional view of an example HAMR head, in accordance with aspects of this disclosure.

FIG. 3B is a cross-sectional view of an example HAMR head, in accordance with aspects of this disclosure. FIG. 3B is an enlarged view of HAMR head 340 of FIG. 3A, with the section of HAMR head 340 illustrated in FIG. 3B indicated by the box marked 3B in FIG. 3A.

Diffusion barrier 337 has a thickness t. In some examples, thickness t of diffusion barrier 337 is between about 2 nanometers and about 20 nanometers. In one example, thickness t of diffusion barrier 337 is between about 5 nanometers and about 15 nanometers.

Diffusion barrier 337 includes a media-facing surface 387M that is recessed a distance $d_1$ from media-facing surface 305 of HAMR head 340. Diffuser 336 includes a media-facing surface $386_M$ that is recessed a distance $d_2$ from media-facing surface 305. In some examples, distance $d_2$ is approximately the same as distance $d_1$ (e.g., within +/−10 percent). In the example of FIG. 3B, a segment of write pole diffusion barrier 363 is disposed along and coupled to media-facing surface 387M and media-facing surface $386_M$. A surface 383M of diffuser 336 is coupled to media-facing surface 387M and media-facing surface $386_M$. Media-facing surface 387M, media-facing surface $386_M$, and surface 383M may be substantially parallel to media-facing surface 305 of HAMR head 340.

Figure 4:
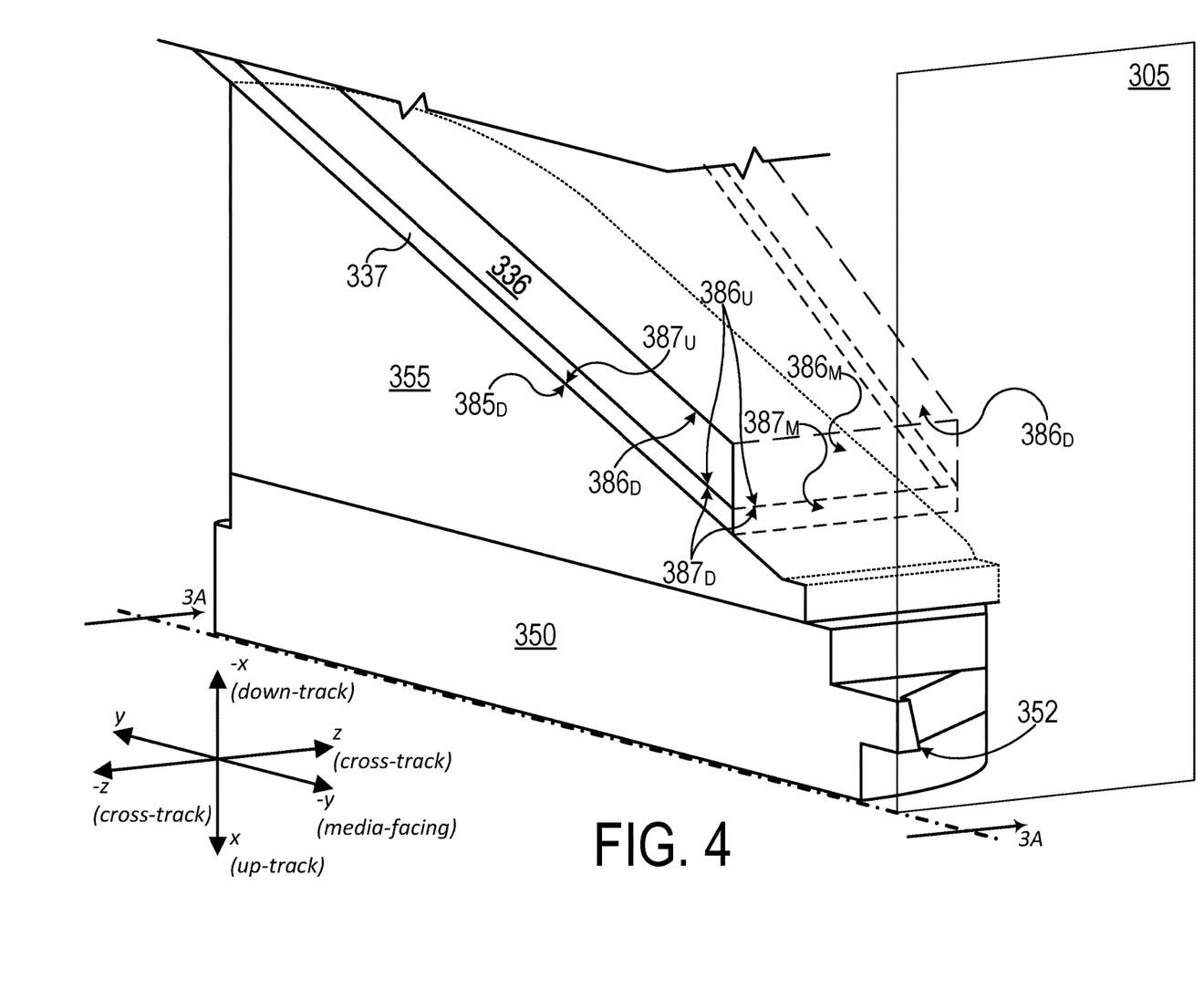
FIG. 4 is a cross-sectional perspective view of an example HAMR head, in accordance with aspects of this disclosure.

FIG. 4 is a cross-sectional perspective view of an example HAMR head, in accordance with aspects of this disclosure. FIG. 4 is a cross-sectional perspective view of HAMR head 340 of FIG. 3A, with the view of the section of HAMR head 340 illustrated in FIG. 3A indicated by the line 3A-3A of FIG. 4 facing in the direction of the arrows. HAMR head 340 includes an NFT 350, a write pole 362, a heat sink 355, a diffuser 336, and a diffusion barrier 337. HAMR head 340 may include a write pole diffusion barrier 363. NFT 350 may include a peg 352.

Diffusion barrier 337 includes an up-track surface $387_U$ that is substantially parallel to and coupled to a down-track surface $385_D$ of heat sink 355. Down-track surface $385_D$ of heat sink 355 slopes away from media-facing surface 305 toward a down-track direction of HAMR head 340. Diffusion barrier 337 further includes a down-track surface $387_D$ that is down-track from and substantially parallel to up-track surface $387_U$. Down-track surface $387_D$ and up-track surface $387_U$ of diffusion barrier 337 terminate at media-facing surface 387M of diffusion barrier 337. Diffuser 336 includes an up-track surface 386u that is substantially parallel to and coupled to down-track surface $387_D$ of diffusion barrier 337. Diffuser 336 includes a down-track surface $386_D$ that is down-track from and substantially parallel to up-track surface $386_U$ of diffuser 336. Down-track surface $386_D$ and up-track surface 386u of diffuser 336 terminate at media-facing surface $386_M$ of diffuser 336. Down-track surface $386_D$ may be coupled to another feature of HAMR head 340 (e.g., write pole diffusion barrier 363 of FIG. 3A).

Various examples have been presented for the purposes of illustration and description. These and other examples are within the scope of the following claims.

What is claimed is:

1. A heat-assisted magnetic recording head comprising:
a near-field transducer configured to produce a hot spot on a proximate magnetic disk, a heat sink configured to draw heat away from the near-field transducer, wherein the heat sink is disposed in a down-track direction relative to and coupled to the near-field transducer;

a diffuser configured to draw heat away from the heat sink, wherein the diffuser is disposed in a down-track direction relative to the heat sink; and a diffusion barrier comprising a metal and disposed between and coupled to the heat sink and the diffuser.

2. The heat-assisted magnetic recording head of claim 1, wherein the metal is a thermally robust metal having a melting temperature of at least 1500 degrees Celsius.

3. The heat-assisted magnetic recording head of claim 1, wherein the metal has a thermal conductivity of at least 50 Watts per meter-Kelvin.

4. The heat-assisted magnetic recording head of claim 1, wherein the metal is a noble metal.

5. The heat-assisted magnetic recording head of claim 4, wherein the noble metal is a platinum group metal.

6. The heat-assisted magnetic recording head of claim 5, wherein the metal is a thermally robust, noble, platinum group metal having a melting temperature of at least 1800 degrees Celsius and a thermal conductivity of at least 80 Watts per meter-Kelvin.

7. The heat-assisted magnetic recording head of claim 6, wherein the metal is a thermally robust, noble, platinum group metal having a melting temperature of at least 2200 degrees Celsius and the thermal conductivity of at least 110 Watts per meter-Kelvin.

8. The heat-assisted magnetic recording head of claim 1, wherein the metal comprises iridium, rhodium, ruthenium, osmium, rhenium, tungsten, molybdenum, niobium, tantalum, platinum, palladium, chromium, vanadium, titanium, zirconium, or hafnium.

9. The heat-assisted magnetic recording head of claim 1, wherein the metal is a primary metal of the diffusion barrier.

10. The heat-assisted magnetic recording head of claim 9, wherein the primary metal of the diffusion barrier is different than a primary metal of the heat sink.

11. The heat-assisted magnetic recording head of claim 9, wherein the primary metal of the diffusion barrier is different than a primary metal of the diffuser.

12. The heat-assisted magnetic recording head of claim 1, wherein a thickness of the diffusion barrier is between about 2 nanometers and about 20 nanometers.

13. The heat-assisted magnetic recording head of claim 1, wherein the diffusion barrier comprises an up-track surface that is substantially parallel to and coupled to a down-track surface of the heat sink.

14. The heat-assisted magnetic recording head of claim 13, wherein the down-track surface of the heat sink slopes away from a media-facing surface of the magnetic recording head toward a down-track direction of the heat-assisted magnetic recording head.

15. The heat-assisted magnetic recording head of claim 13,
wherein the diffusion barrier further comprises a down-track surface that is down-track from and substantially parallel to the up-track surface of the diffusion barrier, and
wherein the diffuser comprises an up-track surface that is substantially parallel to and coupled to the down-track surface of the diffusion barrier.

16. The heat-assisted magnetic recording head of claim 15,
wherein the down-track surface of the diffusion barrier and the up-track surface of the diffusion barrier terminate at a media-facing surface of the diffusion barrier, and
wherein the media-facing surface of the diffusion barrier is recessed a distance from a media-facing surface of the heat-assisted magnetic recording head.

17. The heat-assisted magnetic recording head of claim 16,
wherein the distance is a first distance,
wherein the diffuser comprises a down-track surface that is down-track from and substantially parallel to the up-track surface of the diffuser,
wherein the down-track surface of the diffuser and the up-track surface of the diffuser terminate at a media-facing surface of the diffuser, and
wherein the media-facing surface of the diffuser is recessed a second distance from the media-facing surface of the heat-assisted magnetic recording head.

18. The heat-assisted magnetic recording head of claim 17 wherein the second distance is approximately the same as the first distance.

19. The heat-assisted magnetic recording head of claim 1, further comprising a write pole configured to generate a magnetic field in response to a current passed through a writer coil of the heat-assisted magnetic recording head, the write pole disposed in a down-track direction relative to the near-field transducer.

20. The heat-assisted magnetic recording head of claim 19, further comprising a write pole diffusion barrier disposed along an up-track surface of the write pole.

* * * * *